United States Patent
Wu et al.

(10) Patent No.: US 12,100,116 B2
(45) Date of Patent: Sep. 24, 2024

(54) RANK INFORMATION IN IMMERSIVE MEDIA PROCESSING

(71) Applicant: ZTE Corporation, Guangdong (CN)

(72) Inventors: Zhao Wu, Guangdong (CN); Ping Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 94 days.

(21) Appl. No.: 17/811,170

(22) Filed: Jul. 7, 2022

(65) Prior Publication Data
US 2022/0343457 A1    Oct. 27, 2022

Related U.S. Application Data

(63) Continuation of application No. PCT/CN2020/084137, filed on Apr. 10, 2020.

(51) Int. Cl.
*G06T 3/16* (2024.01)
*G06T 9/00* (2006.01)
*H04L 65/80* (2022.01)
*H04N 19/20* (2014.01)

(52) U.S. Cl.
CPC .................. *G06T 3/16* (2024.01); *G06T 9/00* (2013.01); *H04L 65/80* (2013.01); *H04N 19/20* (2014.11)

(58) Field of Classification Search
None
See application file for complete search history.

(56) References Cited

U.S. PATENT DOCUMENTS

| | | | |
|---|---|---|---|
| 6,853,466 B1 | 2/2005 | Harada et al. | |
| 2016/0150212 A1 | 5/2016 | Moura et al. | |
| 2017/0324945 A1 | 11/2017 | Cole et al. | |
| 2018/0302557 A1 | 10/2018 | Rogers et al. | |
| 2019/0014304 A1 | 1/2019 | Curcio et al. | |
| 2020/0112710 A1* | 4/2020 | Oh | H04N 19/174 |

FOREIGN PATENT DOCUMENTS

| | | |
|---|---|---|
| CN | 102177718 | 9/2011 |
| CN | 106063277 | 10/2016 |
| CN | 106658011 A | 5/2017 |

(Continued)

OTHER PUBLICATIONS

Office Action for co-pending JP Application No. 2022-543081, dated Aug. 21, 2023, 8 pages with machine translation.
(Continued)

*Primary Examiner* — Xiaolan Xu
(74) *Attorney, Agent, or Firm* — Perkins Coie

(57) ABSTRACT

Methods, apparatus, and systems for providing consistent immersive media viewing experiences to user while reducing bandwidth consumption are disclosed. In one example aspect, a method for processing multimedia content includes determining, for a conversion between a frame of panoramic media content comprising multiple segments and a bitstream representation of the frame of panoramic media content, multiple sets of rank information associated with the frame. Each set of the rank information indicates a priority level for processing a segment of the frame of panoramic media content. The method also includes performing the conversion based on the multiple sets of rank information.

18 Claims, 11 Drawing Sheets

100 determining, for a conversion between a frame of panoramic media content comprising multiple segments and a bitstream representation of the frame of panoramic media content, multiple sets of rank information associated with the frame
110 performing the conversion based on the multiple rank parameters
120

(56) References Cited

FOREIGN PATENT DOCUMENTS

| | | |
|---|---|---|
| CN | 108810427 A | 11/2018 |
| CN | 109218734 | 1/2019 |
| JP | 2016-105593 A | 6/2016 |
| JP | 2019-024197 | 2/2019 |
| WO | 2019/141907 | 7/2019 |

OTHER PUBLICATIONS

International Search Report and Written Opinion for International Application No. PCT/CN2020/084137, mailed on Dec. 29, 2020 (7 pages).
First Examination Report for Co-Pending AU Application No. 2020395346, dated Mar. 8, 2023, 3 pages.
Extended European Search Report for EP Application No. 20896790.1, dated Dec. 19, 2022, 8 pages.
Office Action for co-pending KR Application No. 10-2022-7024012, dated Mar. 15, 2024, 9 pages with unofficial English summary.
Second Examination Report for Co-Pending AU Application No. 2020395346, dated Feb. 9, 2024, 3 pages.
JPO, Decision to Grant a Patent for Japanese Application No. 2022-543081, mailed on Feb. 7, 2024, 6 pages with English translation.
Mook et al., "Region-wise quality indication SEI message," JCTVC-AA0030, Mar. 31-Apr. 6, 2017, 59 pages.
Nguyen, et al., "An adaptive streaming method of 360 videos over HTTP/2 protocol," IEEE, 2017, 302-307.
Office Action for co-pending Chinese Application No. 202080085751.1, dated Jul. 8, 2024, 22 pages with machine translation.

* cited by examiner

100 determining, for a conversion between a frame of panoramic media content comprising multiple segments and a bitstream representation of the frame of panoramic media content, multiple sets of rank information associated with the frame
110 performing the conversion based on the multiple rank parameters
120

FIG. 1

| 1 | 2 | 1 |
|---|---|---|
| 3 | 1 | 3 |
| 1 | 3 | 2 |
| 2 | 1 | 2 |

|    |    |    |
|----|----|----|
| 30 | 26 | 26 |
| 30 | 23 | 26 |
| 26 | 23 | 30 |

|  |  |  |  |
|---|---|---|---|
|  | 3 | 2 | 3 |
|  | 2 | 1 | 2 |
|  | 3 | 2 | 3 |
|  |  |  |  |
|  |  |  |  |

| 3 |  | 2 | 3 |
|---|---|---|---|
|  |  | 1 |  |
| 2 |  |  | 3 |
|  | 3 |  |  |
| 2 |  |  | 2 |

FIG. 7B

| 32 | 31 | 22 | 23 |
|----|----|----|----|
| 31 | 32 | 23 | 21 |
| 12 | 11 | 21 | 23 |
| 11 | 12 | 21 | 21 |
| 12 | 12 | 22 | 22 |

RANK INFORMATION IN IMMERSIVE MEDIA PROCESSING

CROSS-REFERENCE TO RELATED APPLICATION

This application is a continuation and claims priority to International Application No. PCT/CN2020/084137, filed on Apr. 10, 2020, the disclosure of which is hereby incorporated by reference herein in its entirety.

TECHNICAL FIELD

This patent document is directed generally to multimedia content processing.

BACKGROUND

Users like to experience content the way they see it in real life. With the advancement of technology, immersive media brings content that is more realistic than ever. Immersive media includes the non-traditional formats driven by emerging technology platforms such as 360-degree images and videos, virtual reality (VR), augmented reality (AR), mixed reality (MR), as well as wearables and the internet of things (IoT).

SUMMARY

This patent document describes, among other things, techniques that provide consistent viewing experiences to user while reducing bandwidth consumption for immersive media.

In one example aspect, a method for processing multimedia content includes determining, for a conversion between a frame of panoramic media content comprising multiple segments and a bitstream representation of the frame of panoramic media content, multiple sets of rank information associated with the frame. Each set of the rank information indicates at least a priority level, a quality level, or a stream switch for processing a segment of the frame of panoramic media content. The method also includes performing the conversion based on the multiple sets of rank information.

In another example aspect, an apparatus in a multimedia system is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 1 is a flowchart representation of a method for processing multimedia content in accordance with the present technology.

FIG. 2 illustrates an example panoramic image with different numerical values representing rank information in accordance with the present technology.

FIG. 3 illustrates an example panoramic image with non-consecutive integer values representing rank information in accordance with the present technology.

FIG. 7A illustrates an example panoramic image with a subset of segments having corresponding rank information in accordance with the present technology.

FIG. 7B illustrates another example panoramic image with a subset of segments having corresponding rank information in accordance with the present technology.

FIG. 8 illustrates an example cascaded representation of the rank information in accordance with the present technology.

DETAILED DESCRIPTION

Figure 4:
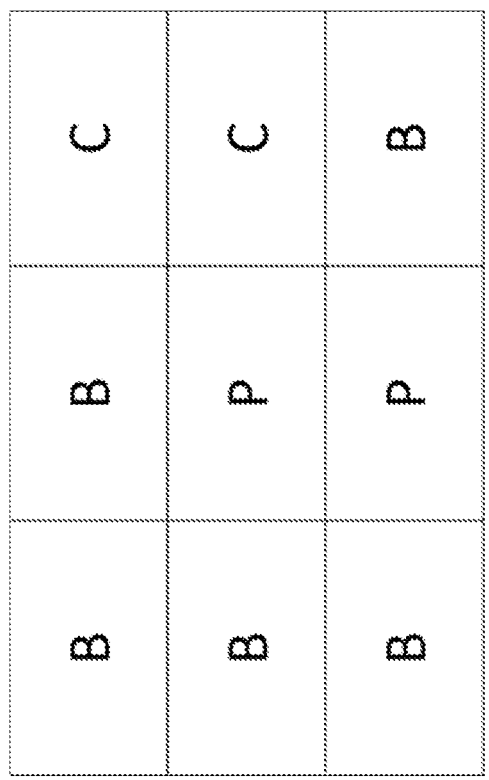
FIG. 4 illustrates an example panoramic image with different characters representing rank information in accordance with the present technology.

Section headings are used in the present document only to improve readability and do not limit scope of the disclosed embodiments and techniques in each section to only that section. The disclosed techniques are applicable to various imaging and/or video standards, including but not limited to the High Efficiency Video Coding (HEVC) standard and the Versatile Video Coding (VVC) standard.

Immersive media refers to the use of multimedia technologies such as audio and video to give users an immersive and a completely different media experience. When watching immersive media content, users can participate in the media in real time (e.g., by wearing a virtual reality headset). Immersive media has successfully extended to many fields such as movies, games, news, and/or medical treatment. Immersive media content is different from conventional media content: the visual content is typical 360-degree panoramic visual data that covers a large image area and a wide field of view, providing users more flexibility in tuning to the content based on their own preferences. Panoramic visual data can be composed using data collected simultaneously from a plurality of cameras or by stitching multiple images from a single camera through translation and/or rotation operations. Panoramic visual data can also be artificially synthesized (e.g., based on existing conventional and/or panorama image data). The panoramic visual data can be represented as a 360-degree spherical or a rectangular image after mapping (e.g., an Equirectangular Projection image). Alternatively, the panoramic visual data can be represented as a rectangular image after mapping and rearrangement (e.g., a Cube Map Projection image).

Displaying immersive media content requires higher bandwidths as compared to conventional media content. Bandwidth requirement remains an issue even with rapid development of mobile networks. Thus, there remains a need to provide effective ways of displaying immersive media content while maintaining reasonable bandwidth usage.

Disclosed herein are techniques that can be implemented in various embodiments to provide high quality immersive media content to users without imposing unreasonable bandwidth requirements to the communication systems. Immersive media content provides 360-degree panoramic field of view to users, but the field of view of human vision is typically within 120 degrees at any given time. Furthermore, users may want to focus on very specific features within a narrow field of view. Therefore, there is no need to maintain a uniform visual quality across the entire panoramic content. Different regions or segments of the panoramic media content can be processed according to a set of priorities to account for user preferences, characteristics of the scene, and/or bandwidth allocations, thereby minimizing bandwidth consumption while providing good user experience. In this patent document, the priorities are referred to as rank information of the visual content. For example, when the user watches an immersive concert video, the user's viewpoint is mainly focused on the performers on the stage. Therefore, part of the content showing the performers can be given a higher rank to provide higher visual quality to the user while the peripheral view is given a lower rank. When the user's viewpoint or the performers' positions changes, the media content can be adjusted accordingly to ensure that the user's viewing area is given a high priority, thereby providing a consistent viewing experience.

To facilitate efficient processing of panoramic visual data, the rank information can be encoded in the bitstream that represents the panoramic video content. The increasing demand of higher resolution videos has led to ubiquitous image and video coding techniques in modern technology. For example, a video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the ISO/IEC based media file format, the HEVC standard (also known as H.265 or MPEG-H Part 2), the VVC standard (also named temporarily as H.266 or MPEG-I Part 3), or other current and/or future video coding standards. Many of the coding standards use hybrid coding, such as using intra-prediction and/or inter-prediction coding techniques, to eliminate spatial redundancy and temporal redundancy. That is, different regions coded using predictive coding techniques are related to each other. In the video encoding process, the encoder first divides the image/frame into one or more regions before encoding these regions. In order to facilitate parallel processing, a region corresponds to a unit in the image that can be decoded independently. A region can be a slice group in the H.264/AVC standard, a tile in the H.265/HEVC standard, a subpicture, a rectangular slice, or a tile in the H.266/VVC standard.

Different regions and/or segments of a frame can be prioritized according to different ranks to ensure optimal user viewing experiences. FIG. 1 is a flowchart representation of a method 100 for processing multimedia content in accordance with the present technology. The method 100 includes, at operation 110, determining, for a conversion between a frame of panoramic media content comprising multiple segments and a bitstream representation of the frame of panoramic media content, multiple sets of rank information associated with the frame. Each set of the rank information indicates at least a priority level, a quality level, or a stream switch for processing a segment of the frame of panoramic media content. The method 100 also includes, at operation 120, performing the conversion based on the multiple sets of rank information. The conversion between the frame of panoramic media content and the bitstream representation includes the encoding and/or decoding process. At the encoding time, the rank information can be encoded in the bitstream when the panoramic media content is collected in real time and/or according to the characteristics of content and user preferences.

In some embodiments, each set of the rank information includes an integer indicating a priority level for processing a corresponding segment of the panoramic media content. In some embodiments, the multiple sets of rank information comprise consecutive integers indicating priority levels for processing multiple segments of the panoramic media content. In some embodiments, each set of the rank information includes one or more characters indicating a priority level for a corresponding segment of the panoramic media content.

In some embodiments, the multiple segments within the frame are equally sized. For example, the multiple segments have rectangular shapes. In some embodiments, at least one segment has a different size than another segment within the frame. For example, the at least one segment has a non-rectangular shape.

In some embodiments, the bitstream representation comprises a parameter indicating a number of the multiple sets of rank information. In some embodiments, each set of the rank information comprises one or more parameters indicating a dimension of the corresponding segment. In some embodiments, at least one segment within the frame lacks a corresponding set of rank information.

In some embodiments, the bitstream representation comprises timing information indicating when the multiple sets of rank information are applicable to the frame. In some embodiments, the bitstream representation comprises viewpoint information indicating one or more viewpoints at which the multiple sets of rank information are applicable to the frame.

In some embodiments, a first segment corresponding to a first priority level is processed prior to a second segment corresponding to a second priority level in case the first priority level has a value that is higher than the second priority level. In some embodiments, only a subset of segments is processed for the conversion. Priority levels of the subset of segments can have values equal to or greater than a predefined threshold. In some embodiments, priority levels of the subset of segments are included in the bitstream representation based on locations of the subset of segments within the frame. In some embodiments, each set of the rank information comprises rank information for a plurality of sub-segments within a corresponding segment.

In some embodiments, the method also includes determining, for a conversion between a subsequent frame of panoramic media content and the bitstream representation, additional sets of rank information associated with a subsequent frame of the panoramic media content. In some embodiments, the additional sets of rank information associated with the subsequent frame comprise values relative to the multiple sets of rank information associated with the frame. In some embodiments, at least one of the multiple sets of rank information associated with the frame is applicable to the subsequent frame of the panoramic media content.

In some embodiments, a region comprises a coding tree unit, a coding tree block, a tile, a macroblock, or a subpicture. In some embodiments, the multiple sets of rank information are represented in Supplemental Enhancement Information or Video Usability Information in the bitstream representation. In some embodiments, the bitstream representation of the panoramic media content is formatted according to ISO/IEC 14496.

In some embodiments, performing the conversion includes generating the bitstream representation based on the current block of the video. In some embodiments, performing the conversion includes generating the current block of the video from the bitstream representation.

Some examples of the disclosed techniques are further described in the following example embodiments.

Embodiment 1

Figure 2:
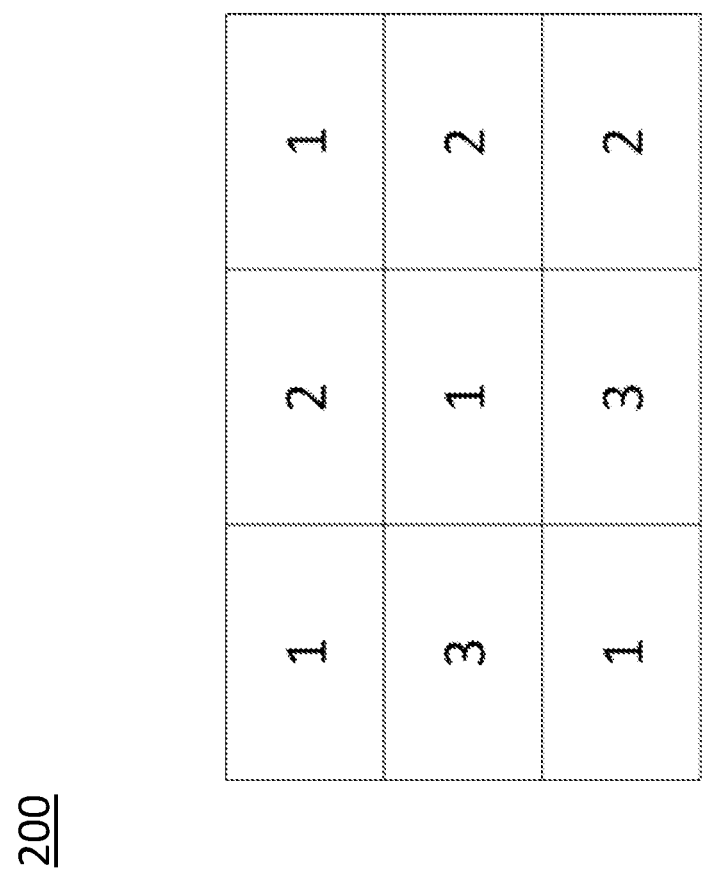

The rank information can be represented in different forms in the bitstream. In some embodiments, the rank information can be represented using one or more numerical values. FIG. 2 illustrates an example panoramic image 200 with different numerical values representing rank information in accordance with the present technology. In FIG. 2, the panoramic image is divided into 9 rectangular regions (or segments). Each region is assigned a value in the range of 1 to 3. Different values can represent different image quality levels and/or different processing priorities for the corresponding regions. For example, 1 represents high image quality, 2 represents medium image quality, and 3 represents low image quality. As another example, 1 represents the highest processing priority, indicating that the corresponding area is processed first in the encoding/decoding process. 2 represents the medium processing priority, and 3 represents the lowest processing priority.

In some embodiments, the values of the level information can represent different director's cuts. For example, 1 represents the first director's cut and 2 represents the second director's cut. The user can view different pictures by selecting different level values corresponding to different cuts. When processing the video bitstream, the decoder can parse and determine the rank information for the region. The decoder then acquires a subsequent video stream of this region based on the rank information. For example, when the user chooses to view the first director's cut (e.g., rank value is 1), the decoder obtains the video stream at time T and acquires a stream corresponding to the rank value of 1 to show the first director's cut. When the user chooses to view the second director's clip (e.g., rank value is 2), the decoder obtains the video stream at time T and acquires a subsequent stream corresponding to the rank value of 2 to show the second director's cut.

Figure 3:
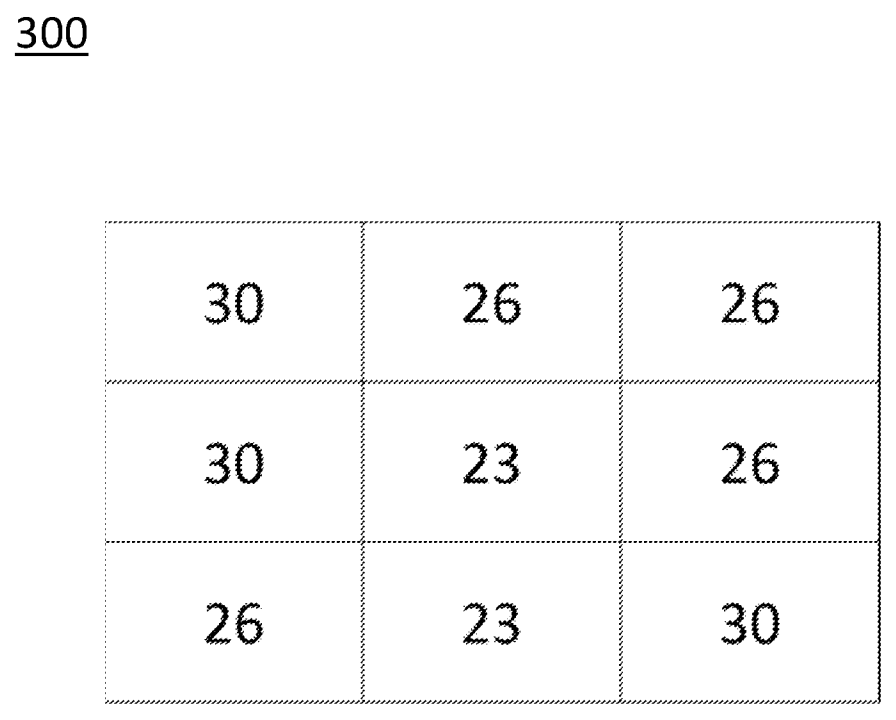

In some embodiments, the values of the rank information can be non-consecutive integers. FIG. 3 illustrates an example panoramic image 300 with non-consecutive integer values representing rank information in accordance with the present technology. As shown in FIG. 3, non-consecutive integer values 23, 26, and 30 are used to indicate different quality and/or priority level for the corresponding regions in the panoramic image.

In some embodiment, the rank information can include scene characteristics that are represented using one or more characters. FIG. 4 illustrates an example panoramic image 400 with different characters representing rank information in accordance with the present technology. As shown in FIG. 4, different characters can represent attributes or scene characteristics of the associated areas. For example, character 'P' stands for People, indicating that the corresponding region shows one or more people. Character 'C' stands for Car, indicating that the corresponding region shows one or more cars. Similarly, character 'B' stands for Background, indicating that the corresponding region displays scene background. In some embodiments, a character string comprising multiple characters can also be used.

Embodiment 2

Figure 5:
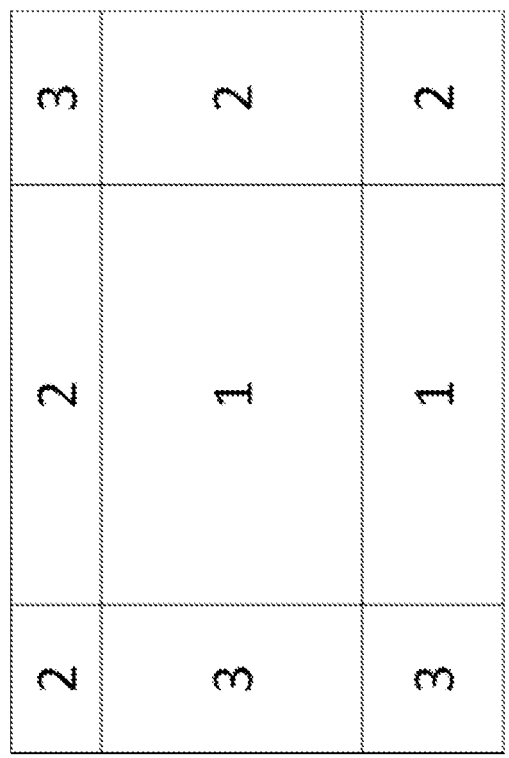
FIG. 5 illustrates an example non-uniform division of a panoramic image in accordance with the present technology.
Figure 6:
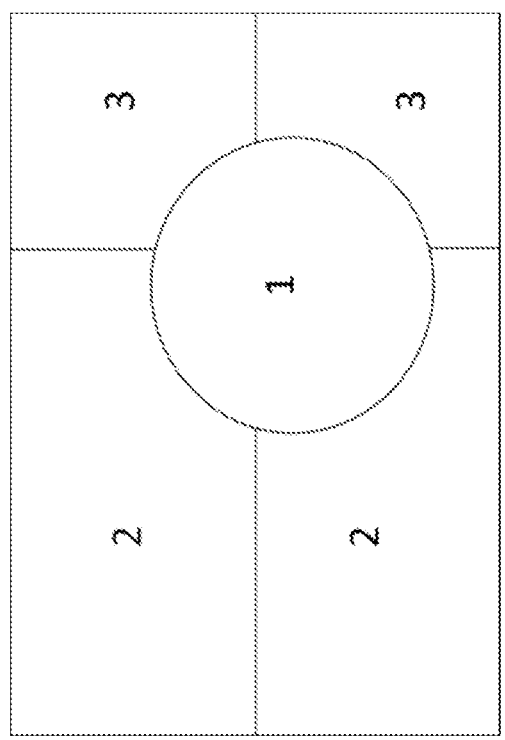
FIG. 6 illustrates another example non-uniform division of a panoramic image in accordance with the present technology.

The regions/segments in a panoramic image can have different sizes and/or shapes. As shown in FIGS. 2-4, in some embodiments, a panoramic image can be equally divided into multiple regions/segments. In some embodiments, a panoramic image can be divided into non-uniformly shaped regions. FIG. 5 illustrates an example non-uniform division of a panoramic image 500 in accordance with the present technology. In this example, the regions/segments are non-uniformly sized rectangular areas. FIG. 6 illustrates another example non-uniform division of a panoramic image 600 in accordance with the present technology. In this example, the regions/segments have non-rectangular shapes. At least one of the segments has a different size and/or shape than another segment in the panoramic image.

Embodiment 3

As discussed above, to expedite processing of the panoramic image (e.g., on the decoding side), rank information can be encoded in the bitstream representation to reduce additional computation and/or processing time. The rank information can be organized according to the region/segments. Table 1 shows an example representation of the rank information in the bitstream in accordance with the present technology.

TABLE 1

An example representation of the rank information

```
aligned(8) class RankMap {
    unsigned int(8) num_ranks;
    for (i = 0; i < num_ranks; i++){
        unsigned int(8) segment_top_left_x[i];
        unsigned int(8) segment_top_left_y[i];
        unsigned int(8) segment_width[i];
        unsigned int(8) segment_height[i];
        unsigned int(8) segment_rank[i];
    }
}
```

Here, num_ranks indicates the number of rank information. This value is the same as the number of segments in the panoramic image.

Table 2 shows another example representation of the rank information in the bitstream in accordance with the present technology.

TABLE 2

Another example representation of the rank information

| | Descriptor |
|---|---|
| rank_map_info( ) { | |
|   rank_cnt_minus1 | u(8) |
|   for( i = 0; i <= rank_cnt_minus1; i++ ) { | |
|     segment_top_left_x[i] | u(8) |
|     segment_top_left_y[i] | u(8) |
|     segment_width[i] | u(8) |
|     segment_height[i] | u(8) |
|     segment_rank[i] | u(8) |
|   } | |
| } | |

Here, rank_cnt_minus1 indicates the number of rank information (e.g., rank_cnt_minums1+1). This value is the same as the number of segments in the panoramic image.

In Table 1 and Table 2, segment_top_left_x[i] indicates the horizontal coordinate of the upper left pixel of the i-th segment in the panoramic image. segment_top_left_y[i] indicates the vertical coordinate of the upper left pixel of the i-th segment in the panoramic image. segment_width[i] indicates the pixel width of the i-th segment. segment_height[i] indicates the pixel height of the i-th segment. segment_rank[i] indicates the rank value of the i-th segment.

In some embodiments, the coordinates of the center point of the segment can be used as the positioning point of the segment instead of the coordinates of the upper left point of the segment. In some embodiments, the coordinates and the positioning points of the segment can be adjusted for the 360-degree spherical panorama 3D coordinates e.g., (Azimuth range, elevation range).

A segment disclosed herein can be associated with different partitioning units based on different standards. For example, a segment can be a grid unit such as a Coding Tree Unit (CTU) in the HEVC/H.265 standard. In the HEVC/H.265 standard, a Coding Tree Block (CTB) is a N×N block of luma and/or chroma samples, where N can be 16, 32, 64, etc. A CTU includes a luma CTB and two chroma CTBs, and is an independent coding unit. The CTU in VVC/H.265 is consistent with the concept of CTU in HEVC/H.265, and is also an independent coding unit. The grid unit can also be a Macroblock in the AVC/H.264 standard. A Macroblock is a 16×16 luma block with its corresponding chroma block. Macroblocks are independent coding units in the AVC/H.264 standard.

Different standards adopt different ways of partitioning a frame. For example, in the HEVC/H.265 and VVC/H.266 standards, partitions can be represented in the form of tiles. A tile divides an image into several rectangular areas from the horizontal and vertical directions. Tile is a rectangular region of CTUs within a particular tile column and a particular tile row in a picture. One or more tiles can correspond to a partition of the image. In the HEVC/H.265 standard, a partition can also be represented in slices. One or more slices correspond a partition and include multiple rows of CTUs. In the VVC/H.266 standard, partitions can be expressed in the form of raster-scan slices. One or more raster scan slices correspond to a partition and includes multiple rows of CTUs. Partitions can also be represented by rectangular slices. One or more rectangular slices can correspond to a partition. Partitions can also be represented by subpictures. One or more subpictures can correspond to a partition.

Table 3 shows another example representation of the rank information in the bitstream in accordance with the present technology.

TABLE 3

Another example representation of the rank information

```
aligned(8) class RankMap {
unsigned int(8) num_ranks;
   for (i = 0; i < num_ranks; i++){
      unsigned int(8) segment_grid_top_left_x[i];
      unsigned int(8) segment_grid_top_left_y[i];
      unsigned int(8) segment_grid_width[i];
      unsigned int(8) segment_grid_height[i];
      unsigned int(8) segment_rank[i];
   }
```

Table 4 shows another example representation of the rank information in the bitstream in accordance with the present technology.

TABLE 4

Another example representation of the rank information

| | Descriptor |
|---|---|
| rank_map_info( ) { | |
|   rank_cnt_minus1 | u(8) |
|   for( i = 0; i <= rank_cnt_minus1; i++ ) { | |
|     segment_grid_top_left_x[i | u(8) |
|     segment_grid_top_left_y[i] | u(8) |
|     segment_grid_width[i] | u(8) |
|     segment_grid_height[i] | u(8) |
|     segment_rank[i] | u(8) |
|   } | |
| } | |

The rank information of each segment can be arranged in a certain predetermined manner (e.g., a zigzag scanning order, an ascending or descending order). In some embodiments, the rank information can be randomly arranged in any order.

In some embodiments, the rank information can exclude specific information about the segments, such as the positioning point and/or size of the segments. Table 5 shows another example representation of the rank information in the bitstream in accordance with the present technology. As shown in Table 5, no specific information about the segments is included in the RankMap. Table 6 shows yet another example representation of the rank information in the bitstream in accordance with the present technology. Similarly, no specific information about the segments is included.

TABLE 5

Another example representation of the rank information

```
aligned(8) class RankMap {
   unsigned int(8) num_ranks;
   for (i = 0; i < num_ranks; i++)
      unsigned int(8) segment_rank[i];
}
```

TABLE 6

Another example representation of the rank information

| | Descriptor |
|---|---|
| rank_map_info( ) { | |
|   rank_cnt_minus1 | u(8) |
|   for( i = 0; i <= rank_cnt_minus1; i++ ) { | |
| segment_rank[i] | u(8) |
|   } | |
| } | |

The specific information about the segments can be positioned separately in the bitstream (e.g., prior to the rank information). In some embodiments, default segments can be used to eliminate the need of including such information in the bitstream.

In some embodiments, the segment corresponding to the rank information can be a subpicture as defined in the VVC/H.266 standard. The segment position and size information are the position and size information of the subpicture. In those cases, rank_cnt_minus1 and sps_num_subpics_minus1 are equal. Each segment_rank[i] and sps_subpic_id[i] has a one-to-one correspondence.

TABLE 7

Another example representation of the rank information

| | Descriptor |
|---|---|
| rank_map_info( ) { | |
|   rank_cnt_minus1 | u(8) |
|   for( i = 0; i <= rank_cnt_minus1; i++ ) { | |
| subpic_id[i] | u(8) |
| segment_rank[i] | u(8) |
|   } | |
| } | |

In some embodiments, the segment corresponding to the rank information can be the temporal motion-constrained tile sets (MCTS) as defined in the H.265/HEVC standard. Table 8 shows an example representation of the rank information as a part of MCTS in accordance with the present technology.

TABLE 8

Another example representation of the rank information

| | Descriptor |
|---|---|
| temporal_motion_constrained_tile_sets( payloadSize ) | |
| { | |
|   mc_all_tiles_exact_sample_value_match_flag | u(1) |
|   each_tile_one_tile_set_flag | u(1) |
|   if( !each_tile_one_tile_set_flag ) { | |
|     limited_tile_set_display_flag | u(1) |
|     num_sets_in_message_minus1 | u(1) |
|     for( i = 0; i <= num_sets_in_message_minus1; i++ ) | |
| { | |
|     mcts_id[ i ] | ue(v) |
|     ...... | |
|     num_tile_rects_in_set_minus1[ i ] | ue(v) |
|     for( j = 0; j <= num_tile_rects_in_set_minus1[ i ]; j++ ) | |
| { | |
|     top_left_tile_index[ i ][ j ] | ue(v) |
|     bottom_right_tile_index[ i ][ j ] | ue(v) |
|   rank_info_flag | u(1) |
|     if(rank_info_flag == 1) | |
|       segment_rank | |
|   } | |
|   ...... | |
| }else { | |
|   max_mcs_tier_level_idc_present_flag | u(1) |
|   if( mcts_max_tier_level_idc_present_flag ) { | |
|     mcts_max_tier_flag | u(1) |
|     mcts_max_level_idc | u(8) |
|   } | |
|   rank_info_flag | u(1) |
|   if(rank_info_flag == 1) | |
|     segment_rank | |
| } | |
|   } | |

Embodiment 4

Figures 7A, 7B:
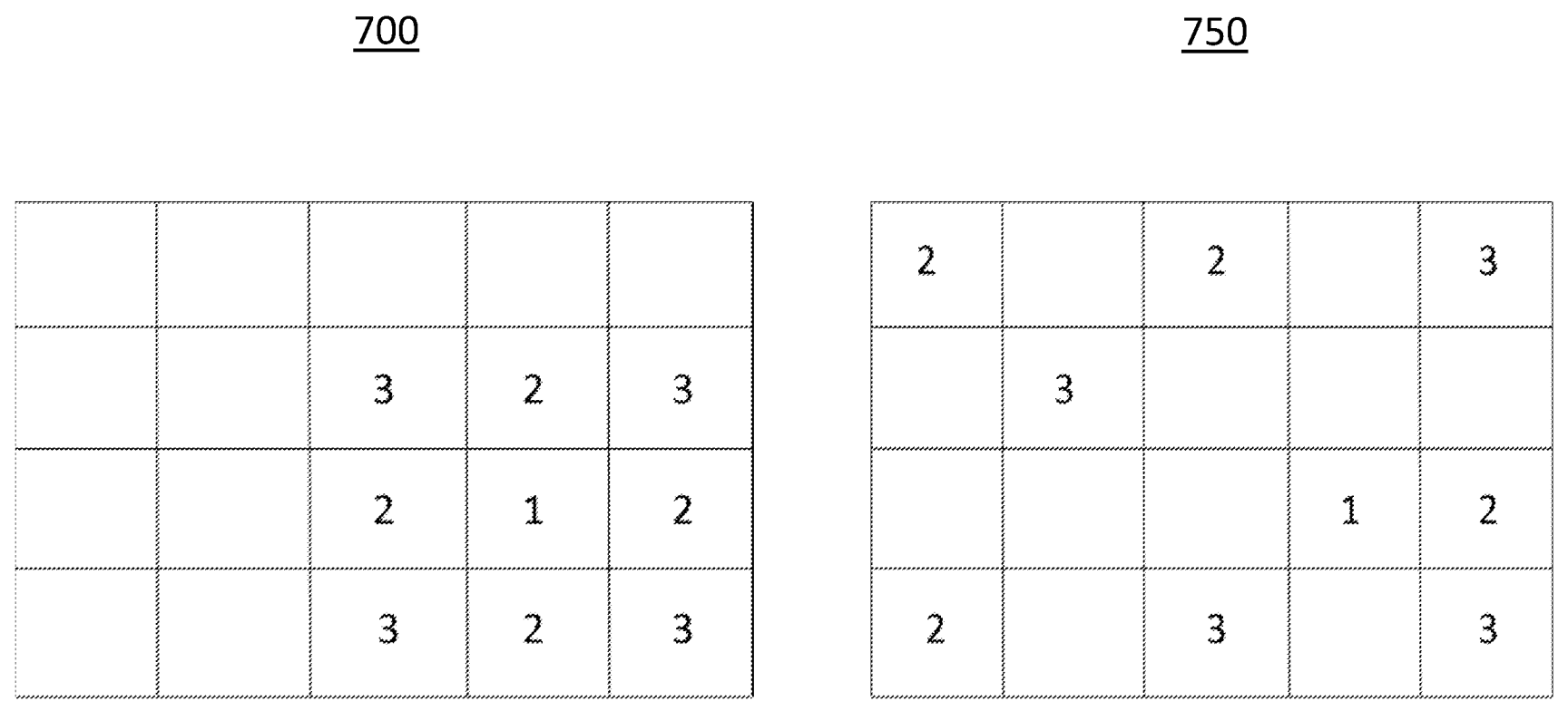

In some embodiments, the rank information only includes specific information for a subset of segments. For example, num_ranks as shown in Table 1 and Table 2 can be smaller than the total number of segments in the panoramic image. FIG. 7A illustrates an example panoramic image 700 with a subset of segments having corresponding rank information in accordance with the present technology. As shown in FIG. 7A, only nine segments in the bottom right corner of the panoramic image have corresponding rank information. Note that the subset of segments does not need to be adjacent to each other. FIG. 7B illustrates another example panoramic image 750 with a subset of segments having corresponding rank information in accordance with the present technology.

In some embodiments, default rank values can be used to process the remaining segments that do not have specific rank information.

Embodiment 5

In some embodiments, the rank information is associated with time. For example, rank information is only applicable to the processing of the panoramic image within a particular time duration. Table 9 shows an example representation of the rank information in the bitstream with corresponding time information in accordance with the present technology.

TABLE 9

Another example representation of the rank information

| aligned(8) class RankMap { |
|---|
|   unsigned int(8) num_ranks; |
|   unsigned int(1) time_flag; |
|   if(time_flag == 1) |
|   { |
|     TimeInfoStruct( ); |
|   } |

TABLE 9-continued

Another example representation of the rank information

```
for (i = 0; i < num_ranks; i++){
    unsigned int(8) segment_top_left_x[i];
    unsigned int(8) segment_top_left_y[i];
    unsigned int(8) segment_width[i];
    unsigned int(8) segment_height[i];
    unsigned int(8) segment_rank[i];
}
```

Variable time_flag being equal to 1 indicates that there is time information associated with the rank information. Its value being 0 indicates there is no relevant time information. TimeInfoStruct can include information that describes the effective time interval of the rank information. For example, TimeInfoStruct can include an absolute start time and end time. As another example, an absolute start time and a duration interval can be used. In some embodiments, a relative start/end time with respect to the last valid rank information can be indicated (see details in Embodiment 7 described below).

If new rank information is acquired within the time duration during which the rank information is valid, the new rank information may be adopted according to preset rules. Alternatively, the new rank information may be ignored until the time duration of the current rank information ends. Table 10 shows example representation of the rank information in the bitstream with corresponding time information in accordance with the present technology. Variable rank_map_info_cancel flag being 1 indicates keeping the current rank information; its value being 0 indicates adopting new rank information. Variable rank-map_info_persistence_flag being 0 indicates that the current rank information is only applicable to the current frame/image; its value being 1 indicates that the current rank information is applicable to subsequence frames/images.

TABLE 10

Another example representation of the rank information

| | Descriptor |
|---|---|
| rank_map_info( ) { | |
|   rank_map_info_cancel_flag; | u(1) |
|   if( ! rank_map_info_cancel_flag ) { | |
|     rank_map_info_persistence_flag; | u(1) |
|     rank_cnt_minus1; | u(8) |
|   for( i = 0; i <= rank_cnt_minus1; i++ ) { | |
|     segment_top_left_x[i]; | u(8) |
|   segment_top_left_y[i]; | u(8) |
|   segment_width[i]; | u(8) |
|   segment_height[i]; | u(8) |
|   segment_rank[i]; | u(8) |
|     } | |
|   } | |
| } | |

Embodiment 6

In some embodiments, the rank information is associated with user's viewpoint. Table 11 shows an example representation of the rank information in the bitstream with corresponding time information in accordance with the present technology.

TABLE 11

Another example representation of the rank information

```
aligned(8) ViewpointPosStruct( ) {
    signed int(32) viewpoint_pos_x;
    signed int(32) viewpoint_pos_y;
    signed int(32) viewpoint_pos_z;
    unsigned int(1) rankmap_flag;
    If(rankmap_flag == 1)
        RankMap( );
}
```

(viewpoint_pos_x, viewpoint_pos_y, viewpoint_pos_z) is the position of the viewpoint. The viewpoint position can also use GPS coordinate information (longitude, latitude, altitude), and the position of the viewpoint can also be three-dimensional polar coordinates (yaw, pitch, roll). Variable rankmap_flag being 1 indicates that there is rank information; its value being 0 indicates that no rank information exists.

The rank information can also change as viewpoint is switched. Table 12 shows an example representation of the rank information in the bitstream in accordance with the present technology.

TABLE 12

Another example representation of the rank information

```
aligned(8) class ViewpointSwitchingStruct( ) {
    unsigned int(8) num_viewpoint_switching;
    for (i = 0; i < num_viewpoint_switching; i++) {
        unsigned int(16) destination_viewpoint_id;
        ......
    unsigned int(1) timeline_switching_offset_flag;
    unsigned int(1) rankmap_flag;
    ......
    if(timeline_switching_offset_flag)
        ViewpointTimelineSwitchStruct( );
    ......
    if(rankmap_flag == 1)
        RankMap( );
    }
}
```

Here, num_viewpoint_switching indicates the number of viewpoint switches and destination_viewpoint_id indicates the serial number of the target viewpoint. Variable timeline_switching_offset_flag being 1 indicates that there is switching time information; its value being 0 indicates that there is no switching time information. Variable rankmap_flag being 1 indicates that there is rank information; its value being 0 indicates that no rank information exists. ViewpointTimelineSwitchStruct indicates the time point of view switching.

In some embodiments, the rank information may not change every time the viewpoint changes. If a viewpoint switching is not associated with a particular set of rank information, current valid rank information or a default predefined rank information can be used.

Embodiment 7

The rank value in the rank information can be an absolute value or a relative value. Table 13 shows an example representation of the rank information in the bitstream in accordance with the present technology. Variable rank_diff_flag can be added to indicate whether absolute values or relative values are used. When the value is 1, relative rank values can be used. When the value is 0, absolute values can be used.

TABLE 13

Another example representation of the rank information

| | Descriptor |
|---|---|
| rank_map_info( ) { | |
|   rank_cnt_minus1 | u(8) |
|   rank_diff_flag | u(8) |
|   for( i = 0; i <= rank_cnt_minus1; i++ ) { | |
|     segment_top_left_x[i] | u(8) |
| segment_top_left_y[i] | u(8) |
| segment_width[i] | u(8) |
| segment_height[i] | u(8) |
| segment_rank[i] | u(8) |
|   } | |
| } | |

Embodiment 8

The rank information can be represented in a cascaded form. FIG. 8 illustrates an example cascaded representation 800 of the rank information in accordance with the present technology. The thick solid lines as shown in FIG. 8 represent a segment, and the thin solid lines represent the sub-segment. For example, 11 represents 1 sub-division of segment 1. Table 14 shows an example representation of the rank information in the bitstream in accordance with the present technology.

TABLE 14

Another example representation of the rank information

| | Descriptor |
|---|---|
| rank_map_info( ) { | |
|   rank_cnt_minus1 | u(8) |
|   for( i = 0; i <= rank_cnt_minus1; i++ ) { | |
|     segment_top_left_x[i] | u(8) |
| segment_top_left_y[i] | u(8) |
| segment_width[i] | u(8) |
| segment_height[i] | u(8) |
| segment_rank[i] | u(8) |
|     sub_segment_cnt_minus1 | u(8) |
| for( j = 0; j <= sub_segment_cnt_minus1; j++ ) { | |
|       sub_segment_top_left_x[j] | u(8) |
| sub_segment_top_left_y[j] | u(8) |
| sub_segment_width[j] | u(8) |
| sub_segment_height[j] | u(8) |
| sub_segment_rank[j] | u(8) |
|     } | |
|   } | |
| } | |

Here, sub_segment_cnt_minus1 indicates the number of sub-segment rank information. sub_segment_top_left_x[j] is the coordinate of the upper left pixel of the jth sub-segment in the horizontal direction of the image. sub_segment_top_left_y[j] is the vertical coordinate of the upper left pixel of the jth sub-segment in the image. sub_segment_width[j] is the pixel width of the jth sub-segment. sub_segment_height[j] is the pixel height of the jth sub-segment. sub_segment_rank[j] is the rank value of the jth sub-segment.

In some embodiments, the segment does not have a corresponding rank value (e.g., segment_rank[i] information does not exist). Only the sub-segment rank values are used.

Embodiment 9

In some embodiments, the rank information is represented in the Supplemental Enhancement Information (SEI) in the video stream. Table 15 shows an example representation of the rank information in the bitstream in accordance with the present technology.

TABLE 15

Another example representation of the rank information

| | Descriptor |
|---|---|
| sei_payload( payloadType, payloadSize ) { | |
| ...... | |
|   if( payloadType = = RANK_MAP_INFO) { | |
|     ...... | |
|     rank_map_info( payloadSize ); | |
| ...... | |
| } | |
| } | |

In some embodiments, the rank information is represented in the Video Usability Information (VUI) in the video bitstream. Table 16 shows an example representation of the rank information in the bitstream in accordance with the present technology. Variable rank_map_info_flag can indicate whether rank_map_info is used. When the value is 1, rank_map_info can be used. When the value is 0, rank_map_info can be skipped.

TABLE 16

Another example representation of the rank information

| | Descriptor |
|---|---|
| vui_parameters( ) { | |
|   ...... | |
|   rank_map_info_flag | u(1) |
|   if(rank_map_info_flag) { | |
|     ...... | |
|     rank_map_info( ) | |
|     ...... | |
|   } | |
| } | |

Embodiment 10

The media code stream in the above embodiments can be stored in media files, e.g., based on the International Organization for Standardization (ISO) basic media file format.

All data in the ISO basic file format is packed in a box. That is, the ISO basic file format represented by MP4 files consists of several boxes, each of which has a type and length and can be regarded as a data object. A box can contain another box, referred to as a container box. An MP4 file has only one "ftyp" type box, which serves as a sign of the file format and contains some information about the file. There is also only one "MOOV" type box (Movie Box), which is a container box. The sub-boxes of the Movie Box include metadata information of the media. The media data of the MP4 file is included in a "mdat" type box (Media Data Box), which is also a container box. In addition, the timing metadata track is a mechanism in the ISO Basic Media File Format (ISOBMFF) to establish timing metadata associated with specific samples.

For example, Table 17 shows an example viewpoint that uses the track entry type as 'vipo'. Rank information can be combined with the viewpoint information (e.g., positioned within ViewpointPosStruct or ViewpointSwitchingStruct).

TABLE 17

An example viewpoint definition

```
aligned(8) class ViewpointTrackGroupBox extends
TrackGroupTypeBox('vipo') {
    string viewpoint_label;
    ......
    ViewpointPosStruct( );
    ......
    ViewpointSwitchingStruct( );
}
```

Figure 9:
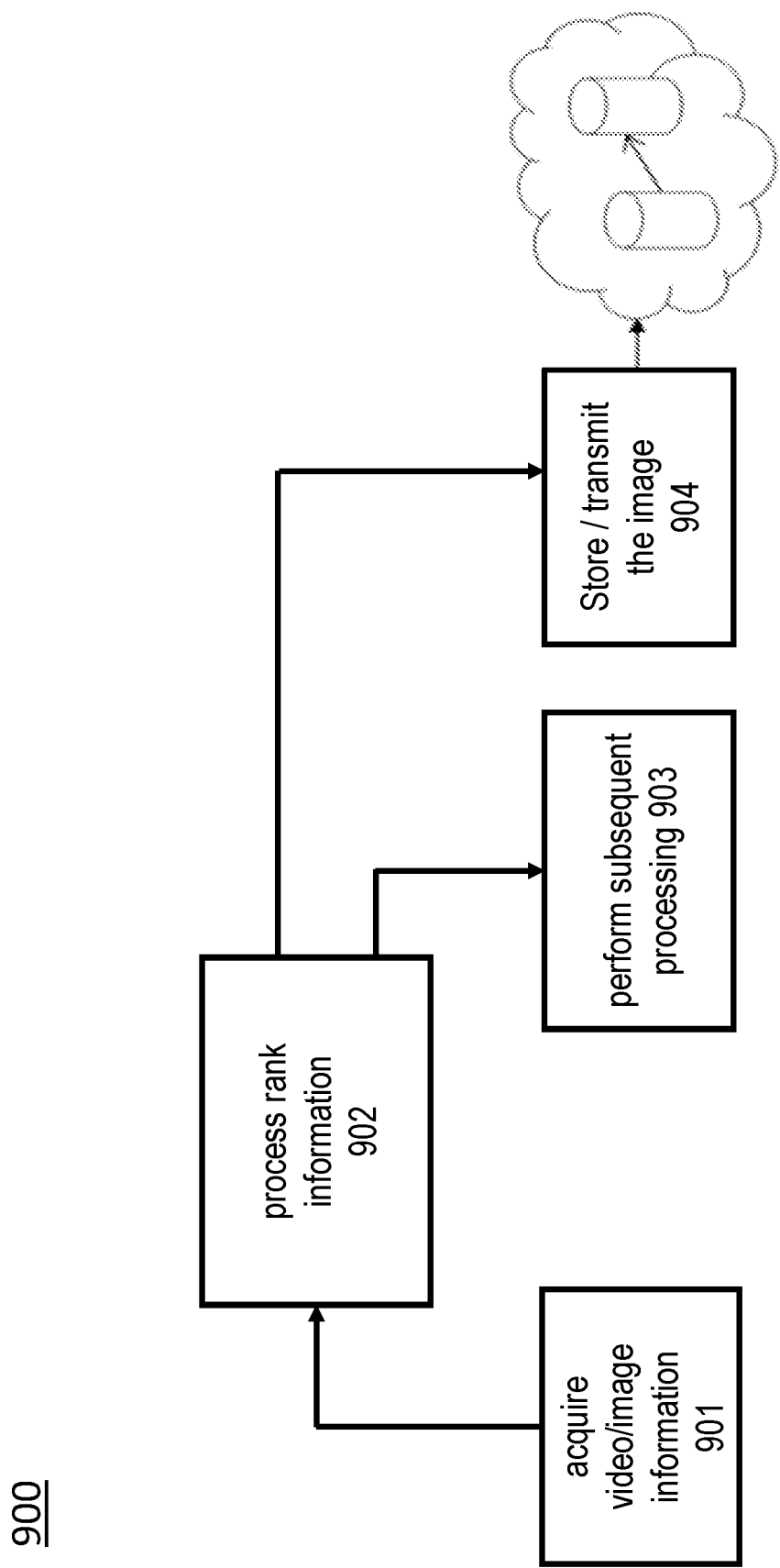
FIG. 9 is a block diagram of an example of a video encoding apparatus in accordance with the present technology.

FIG. 9 is a block diagram of an example of a video encoding apparatus 900 in accordance with the present technology. The apparatus 900 includes an acquiring module 901 that is configured to collect spherical panoramic video image information. This module may include input-output controller circuitry for reading video data from memory or from a camera frame buffer. This module may include processor executable instructions for reading video data. The apparatus 900 includes a rank information processing module 902 that is configured to determine rank information associated with the segments/regions. This module may be implemented as processor executable software code. The apparatus 900 also includes a video encoder module 903 configured to encode the video image data according to the rank information. The video encoder module 903 may for example be a conventional H.264/H.265 or another codec that is suitable for encoding of video and images that are rectangular in shape. The video encoder module 903 may use techniques that use motion estimation/compensation or intra-image coding techniques. The apparatus further includes a store/transmission module 904 is configured to perform either storage or network transmission layer coding on the video encoded data or the media data.

The above-described acquisition device 901, rank information processing module 902, video encoder 903, and transmission module 904 can be implemented by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The apparatus 900 as shown in FIG. 9 may be a device in a video application, such as a mobile phone, a computer, a server, a set top box, a portable mobile terminal, a digital video camera, a television broadcast system device, or the like.

Figure 10:
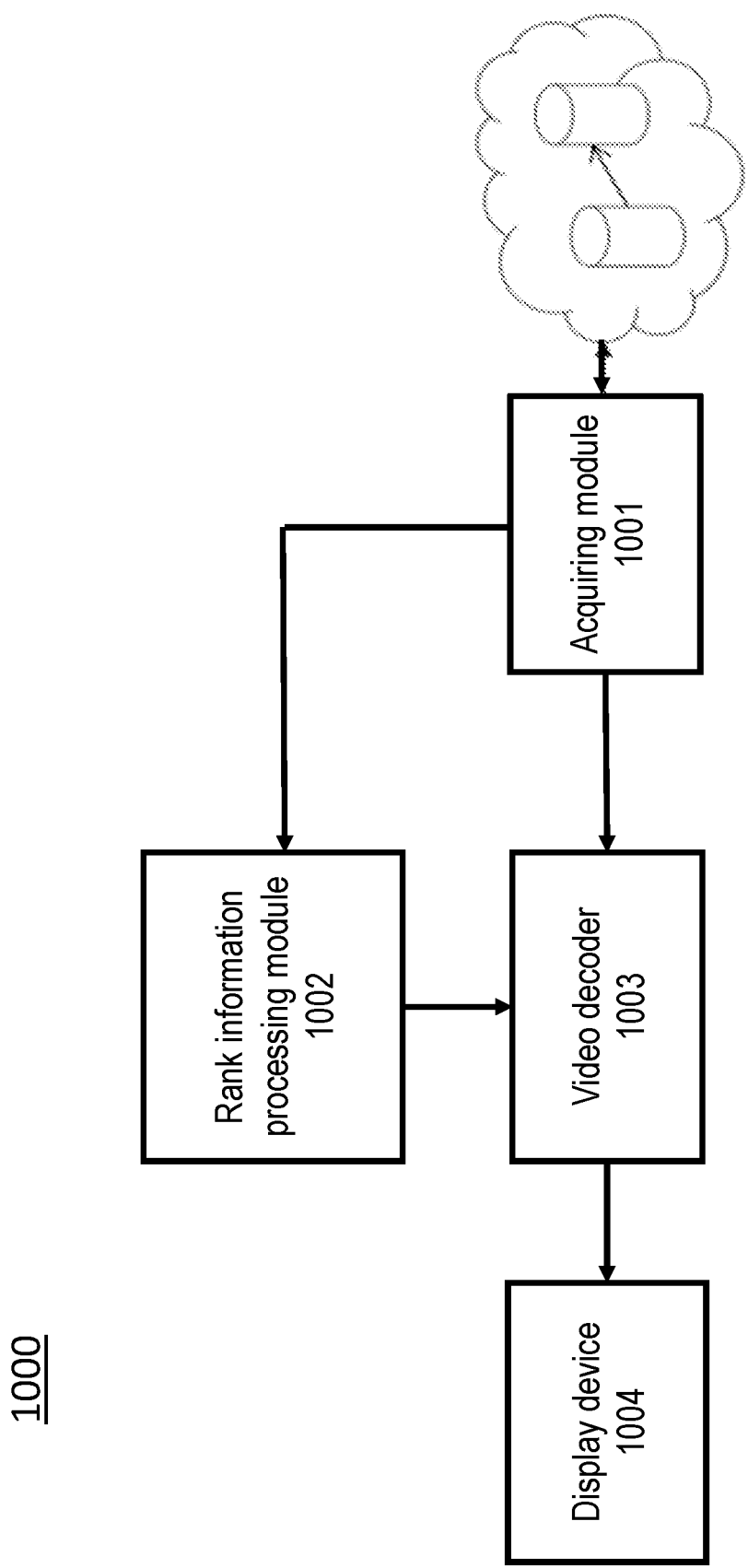
FIG. 10 is a block diagram of an example of a video decoding apparatus in accordance with the present technology.

FIG. 10 is a block diagram of an example of a video decoding apparatus 1000 in accordance with the present technology. The apparatus 1000 includes an acquiring module 1001 that is configured to acquire the bitstream from the network or a storage device and perform decoding from network transmission layer data including video encoded data or media data, and may only propose area neighbor information data, or extract video data including area neighbor information. The rank information processing module 1002 is configured to parse the rank information. The video decoder 1003 is configured to decode the video data information, decode the panoramic video, or extract the independent decoding unit where the region of interest is located for decoding. The display device 1004 is configured to generate or display a panoramic video image or select a partial adjacent area image display.

The above-described transmission module 1001, the area adjacent information processing module 1002, the video decoder 1003, and the display device 1004 can be realized by using dedicated hardware or hardware capable of performing processing in combination with appropriate software. Such hardware or special purpose hardware may include application specific integrated circuits (ASICs), various other circuits, various processors, and the like. When implemented by a processor, the functionality may be provided by a single dedicated processor, a single shared processor, or multiple independent processors, some of which may be shared. In addition, a processor should not be understood to refer to hardware capable of executing software, but may implicitly include, without limitation, digital signal processor (DSP) hardware, read-only memory (ROM) for storing software, random Access memory (RAM), as well as non-volatile storage devices.

The device as shown in FIG. 10 may be a device in a video application, such as a mobile phone, a computer, a server, a set top box, a portable mobile terminal, a digital video camera, a television broadcast system device, or the like.

Figure 11:
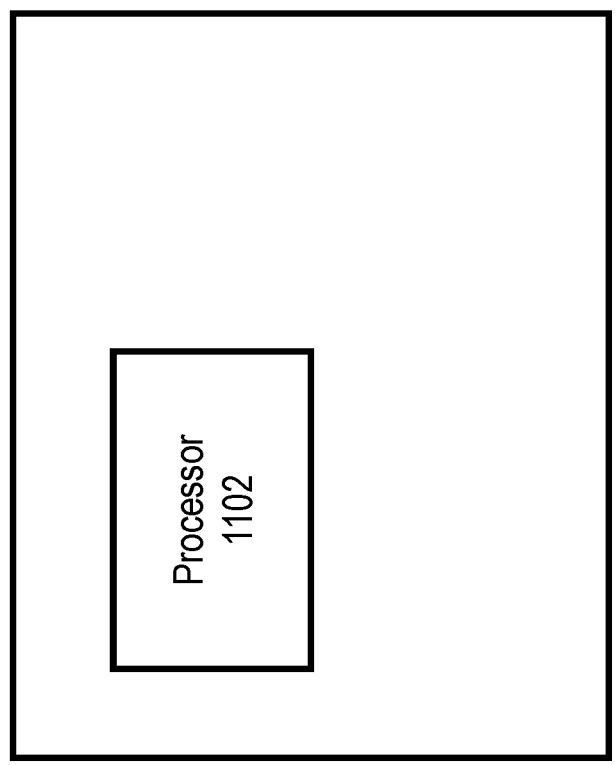
FIG. 11 is a block diagram of an embodiment of a hardware platform for implementing methods described herein.

FIG. 11 shows an example apparatus 1100 that may be used to implement encoder-side or decoder-side techniques described in the present document. The apparatus 1100 includes a processor 1102 that may be configured to perform the encoder-side or decoder-side techniques or both. The apparatus 1100 may also include a memory (not shown) for storing processor-executable instructions and for storing the video bitstream and/or display data. The apparatus 1100 may include video processing circuitry (not shown), such as transform circuits, arithmetic coding/decoding circuits, and so on. The video processing circuitry may be partly included in the processor and/or partly in other dedicated circuitry such as graphics processors, field programmable gate arrays (FPGAs) and so on.

It will be appreciated that the present document discloses techniques that can be embodied in various embodiments to provide consistent immersive content viewing experience to users while reducing bandwidth requirements. The disclosed media content processing system and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for processing multimedia content, comprising:
    determining, for a conversion between a first frame of panoramic media content comprising multiple segments and a bitstream representation of the panoramic media content, multiple sets of rank information associated with the first frame, wherein each set of the rank information indicates at least a priority level, a quality level, or a stream switch for processing a segment of the first frame of panoramic media content;
    determining, for a conversion between a second frame of panoramic media content subsequent to the first frame in a time domain and the bitstream representation, additional sets of rank information associated with the second frame of the panoramic media content, wherein the additional sets of rank information associated with the second frame comprise values relative to the multiple sets of rank information associated with the first frame; and
    performing the conversion based on the multiple sets of rank information.

2. The method of claim 1, wherein each set of the multiple sets of rank information includes an integer indicating a priority level for processing a corresponding segment of the panoramic media content.

3. The method of claim 1, wherein at least one segment has a different size than another segment within the first frame, and wherein the at least one segment has a non-rectangular shape.

4. The method of claim 1, wherein the bitstream representation comprises a parameter indicating a number of the multiple sets of rank information.

5. The method of claim 2, wherein each set of the rank information comprises one or more parameters indicating a dimension of the corresponding segment.

6. The method of claim 1, wherein at least one segment within the first frame lacks a corresponding set of rank information.

7. The method of claim 1, wherein the bitstream representation comprises timing information indicating when the multiple sets of rank information are applicable to the first frame or viewpoint information indicating one or more viewpoints at which the multiple sets of rank information are applicable to the first frame.

8. The method of claim 1, wherein a first segment corresponding to a first priority level is processed prior to a second segment corresponding to a second priority level in case the first priority level has a value that is higher than the second priority level.

9. The method of claim 1, wherein only a subset of the multiple segments is processed for the conversion, and wherein priority levels of the subset of the multiple segments have values equal to or greater than a predefined threshold, or wherein the priority levels are included in the bitstream representation based on locations of the subset of the multiple segments within the first frame.

10. An apparatus in a multimedia system comprising a processor and a non-transitory memory with instructions thereon, wherein the instructions upon execution by the processor, cause the apparatus to perform operations comprising:

determining, for a conversion between a first frame of panoramic media content comprising multiple segments and a bitstream representation of the panoramic media content, multiple sets of rank information associated with the first frame, wherein each set of the rank information indicates at least a priority level, a quality level, or a stream switch for processing a segment of the first frame of panoramic media content;

determining, for a conversion between a second frame of panoramic media content subsequent to the first frame in a time domain and the bitstream representation, additional sets of rank information associated with the second frame of the panoramic media content, wherein the additional sets of rank information associated with the second frame comprise values relative to the multiple sets of rank information associated with the first frame; and performing the conversion based on the multiple sets of rank information.

11. The apparatus of claim 10, wherein each set of the multiple sets of rank information includes an integer indicating a priority level for processing a corresponding segment of the panoramic media content.

12. The apparatus of claim 10, wherein at least one segment has a different size than another segment within the first frame, and wherein the at least one segment has a non-rectangular shape.

13. The apparatus of claim 10, wherein the bitstream representation comprises a parameter indicating a number of the multiple sets of rank information.

14. The apparatus of claim 11, wherein each set of the rank information comprises one or more parameters indicating a dimension of the corresponding segment.

15. The apparatus of claim 10, wherein at least one segment within the first frame lacks a corresponding set of rank information.

16. The apparatus of claim 10, wherein the bitstream representation comprises timing information indicating when the multiple sets of rank information are applicable to the first frame or viewpoint information indicating one or more viewpoints at which the multiple sets of rank information are applicable to the first frame.

17. The apparatus of claim 10, wherein a first segment corresponding to a first priority level is processed prior to a second segment corresponding to a second priority level in case the first priority level has a value that is higher than the second priority level.

18. The apparatus of claim 10, wherein only a subset of the multiple segments is processed for the conversion, and wherein priority levels of the subset of the multiple segments have values equal to or greater than a predefined threshold, or wherein the priority levels are included in the bitstream representation based on locations of the subset of the multiple segments within the first frame.

* * * * *